(12) United States Patent
Achour et al.

(10) Patent No.: US 11,994,579 B2
(45) Date of Patent: May 28, 2024

(54) HYBRID RADAR AND CAMERA EDGE SENSORS

(71) Applicant: BDCM A2 LLC, Dover, DE (US)

(72) Inventors: Maha Achour, Encinitas, CA (US); Matthew Paul Harrison, Palo Alto, CA (US)

(73) Assignee: BDCM A2 LLC, Dover, DE (US)

( * ) Notice: Subject to any disclaimer, the term of this patent is extended or adjusted under 35 U.S.C. 154(b) by 317 days.

(21) Appl. No.: 17/001,541

(22) Filed: Aug. 24, 2020

(65) Prior Publication Data

US 2021/0055407 A1 Feb. 25, 2021

Related U.S. Application Data

(60) Provisional application No. 62/890,527, filed on Aug. 22, 2019.

(51) Int. Cl.
| | |
|---|---|
| *G01S 13/86* | (2006.01) |
| *G01S 13/06* | (2006.01) |
| *G01S 13/931* | (2020.01) |
| G01S 7/40 | (2006.01) |

(52) U.S. Cl.
CPC ............ *G01S 13/867* (2013.01); *G01S 13/06* (2013.01); *G01S 13/931* (2013.01); G01S 7/4026 (2013.01)

(58) Field of Classification Search
None
See application file for complete search history.

(56) References Cited

U.S. PATENT DOCUMENTS

| | | | | |
|---|---|---|---|---|
| 6,765,495 | B1* | 7/2004 | Dunning | G08G 1/161 |
| | | | | 340/439 |
| 7,486,202 | B2* | 2/2009 | Konishi | G08G 1/163 |
| | | | | 340/901 |
| 9,558,667 | B2* | 1/2017 | Bowers | G08G 1/16 |
| 10,310,087 | B2* | 6/2019 | Laddha | G01S 17/931 |
| 10,621,461 | B1* | 4/2020 | Huber | G06V 10/40 |
| 10,671,068 | B1* | 6/2020 | Xu | G06N 20/10 |
| 10,730,512 | B2* | 8/2020 | Kutila | G05D 1/0231 |
| 10,757,485 | B2* | 8/2020 | Al-Stouhi | G07C 5/008 |
| 2002/0198660 | A1* | 12/2002 | Lutter | G08G 1/162 |
| | | | | 342/455 |
| 2003/0102997 | A1* | 6/2003 | Levin | G01S 13/931 |
| | | | | 340/902 |
| 2012/0277989 | A1* | 11/2012 | Zeller | G08G 1/16 |
| | | | | 701/301 |
| 2016/0223643 | A1* | 8/2016 | Li | G01S 13/931 |
| 2017/0206436 | A1* | 7/2017 | Schiffmann | G01S 13/931 |
| 2017/0371329 | A1* | 12/2017 | Giering | G06V 10/454 |

* cited by examiner

*Primary Examiner* — Bernarr E Gregory
(74) *Attorney, Agent, or Firm* — Dinsmore & Shohl LLP

(57) ABSTRACT

Systems, methods, and apparatus for hybrid radar and camera edge sensors are disclosed. Examples disclosed herein relate to a hybrid sensor system having a plurality of edge sensors positioned on the perimeter of a vehicle. The hybrid sensor system processes signals received from the various sensors to identify a target located within the vicinity of the vehicle.

20 Claims, 11 Drawing Sheets

HYBRID RADAR AND CAMERA EDGE SENSORS

CROSS REFERENCE TO RELATED APPLICATION

This application claims priority to, and the benefit of, U.S. Provisional Patent Application No. 62/890,527, filed on Aug. 22, 2019, the entire disclosure of which is expressly incorporated by reference herein.

FIELD OF THE INVENTION

The present invention relates to sensor systems, and specifically to hybrid systems combining radar including meta-structures and metamaterials with other sensors, such as cameras.

BACKGROUND

From a sensor collecting data to a sensor fusion or to a combination of central processing units, there is a variety of information available during operation of a vehicle or machine. This information has been used in the obvious purposes for which sensors are typically used. For example, cameras are purposed with capturing the environment around a vehicle and providing a visual description to a driver of the areas of the vehicle that are not visible, such as when the vehicle operates in reverse. These various sensor technologies are combined into a comprehensive operation of a vehicle, where a sensor fusion module receives information from multiple sensors and makes decisions for vehicle control, driver notification, and feedback to machine learning algorithms. Together these sensors make vehicle operation safer and more automated, which provides for a quicker reaction time. Autonomous driving technologies are developing to combine computational models with the various sensor systems to provide for a safer driving experience for all.

SUMMARY

The present disclosure relates to methods, systems, and apparatuses for hybrid radar and camera edge sensor. In one or more examples, a hybrid sensor system comprises a first sensor module and a second sensor module. The system further comprises a first perception engine coupled to the first sensor module, and a second perception engine coupled to the second sensor module. Further, the system comprises a combination module configured to interpret outputs from the first perception engine and the second perception engine and to identify at least one target based on the interpreted outputs.

In one or more examples, the first sensor module and the second sensor module are positioned on a perimeter of a vehicle. In at least one example, the vehicle is a terrestrial vehicle, a marine vehicle, or an airborne vehicle. In some examples, the vehicle is an autonomous vehicle.

In at least one example, the system further comprises a data triage module configured to identify specific types of information from the first sensor module and the second sensor module. In some examples, the system further comprises an edge fusion module configured to process a first sensor module output and a second sensor module output.

In one or more examples, the combination module outputs data in a point cloud format. In at least one example, the first sensor module is a camera module, and the second sensor module is a radar module. In some examples, the system further comprises a digitizing module configured to digitize camera data from the camera module and to generate digitized data based on the digitized camera data, and an extraction module configured to interpret radar data from the radar module and to generate a Range-Doppler map based on the interpreted radar data. In one or more examples, the radar module comprises a meta-structure array of antenna elements.

In at least one example, a method for environmental perception of a vehicle comprises generating first sensor data, and generating second sensor data. The method further comprises analyzing the first sensor data, and generating a first perception engine output based on analyzing the first sensor data. Also, the method comprises analyzing the second sensor data, and generating a second perception engine output based on analyzing the second sensor data. In addition, the method comprises combining and interpreting the first perception engine output and the second perception engine output. Further, the method comprises identifying at least one target based on the combining and the interpreting.

In one or more examples, the method further comprises sensing first sensor information. In at least one example, the generating of the first sensor data comprises processing the first sensor information. In some examples, the method further comprises sensing second sensor information. In at least one example, the generating of the second sensor data comprises processing the second sensor information. In some examples, the generating of the first sensor data further comprises filtering out spurious data from the first sensor information, and the generating of the second sensor data further comprises filtering out spurious data from the second sensor information.

In one or more examples, the sensing of the first sensor information is performed by a camera sensor, and the method further comprises controlling the camera sensor to focus light and/or steer the light. In some examples, the sensing of the second sensor information is performed by a radar sensor, and the method further comprises controlling the radar sensor to steer a beam and/or adjust a beamwidth of the beam.

In at least one example, the processing of the first sensor data and the second sensor data comprises at least one of digital processing or analog processing. In one or more examples, the method further comprises outputting identification information related to at least one target. In at least one, the identification information comprises an identity, a velocity, and/or a location of at least one target. In some examples, the identification information is in a point cloud format.

In one or more examples, a method for environmental perception of a first vehicle comprises generating, by a first sensor module on a second vehicle, sensor data. The method further comprises transmitting, by the first sensor module on the second vehicle, the sensor data to a second sensor module on the first vehicle. Also, the method comprises receiving, by the second sensor module on the first vehicle, the sensor data. Further, the method comprises identifying, by a perception engine on the first vehicle, at least one target by using the sensor data.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

Figure 1A:
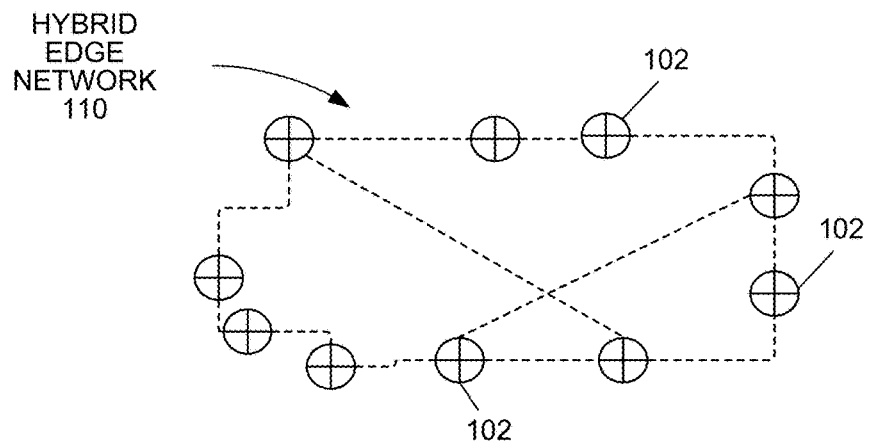
FIG. 1A illustrates a hybrid edge network, according to various examples.

The present disclosure provides an edge network with edge fusion capability by combining one or more sensor types (e.g., radar and camera sensors) into a hybrid edge sensor. The data sensed by these sensors may then be processed using artificial intelligence (AI) engines or expert systems to make independent decisions in real time.

In particular, the present disclosure describes edge network systems comprising hybrid sensor systems. In some examples, the sensors are integrated in an automotive system and include a radar sensor and a camera sensor. These sensors are part of an edge infrastructure, and may be considered to be microdata centers deployed for hyper-local control that allow for information to be processed locally or sent to a central controller, such as a sensor fusion. The edge infrastructure, or edge network, is able to process more data and provide additional storage capacity with extremely low latency compared to centralized sensor fusions and other applications.

During operation, data is collected by edge sensors and processing components, including application-specific integrated circuits (ASICs) and so forth. These components offer a first line of sensing, referred to herein as "edge fusion", in processing and storing information, including analysis and forecasting processes. The applications for such edge processing range from watches to autonomous vehicles. While independent operation is often supported, these sensors are also part of a larger network operating through sensor fusion, as required. In some cases, the sensor fusion acts as a master control, when an edge sensor(s) operates in a slave mode.

In the following description, numerous details are set forth in order to provide a more thorough description of the system. It will be apparent, however, to one skilled in the art, that the disclosed system may be practiced without these specific details. In the other instances, well known features have not been described in detail, so as not to unnecessarily obscure the system.

Examples of the present disclosure may be described herein in terms of functional and/or logical components and various processing steps. It should be appreciated that such components may be realized by any number of hardware, software, and/or firmware components configured to perform the specified functions. For example, the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that examples of the present disclosure may be practiced in conjunction with other components, and that the systems described herein are merely examples that may be employed of the present disclosure.

For the sake of brevity, conventional techniques and components related to sensor systems (e.g., radar and camera systems), and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in one or more examples of the present disclosure.

FIG. 1A illustrates a hybrid edge network 110, according to various examples. The hybrid edge network 110 comprises a plurality of hybrid modules 102. Each hybrid module 102 may comprise one or more sensors, such as a radar sensor and/or a camera sensor. Some or all of the hybrid modules 102 may be communicatively coupled (e.g., via wire or wirelessly by radio frequency (RF) or optical signals) with one another.

Figure 1B:
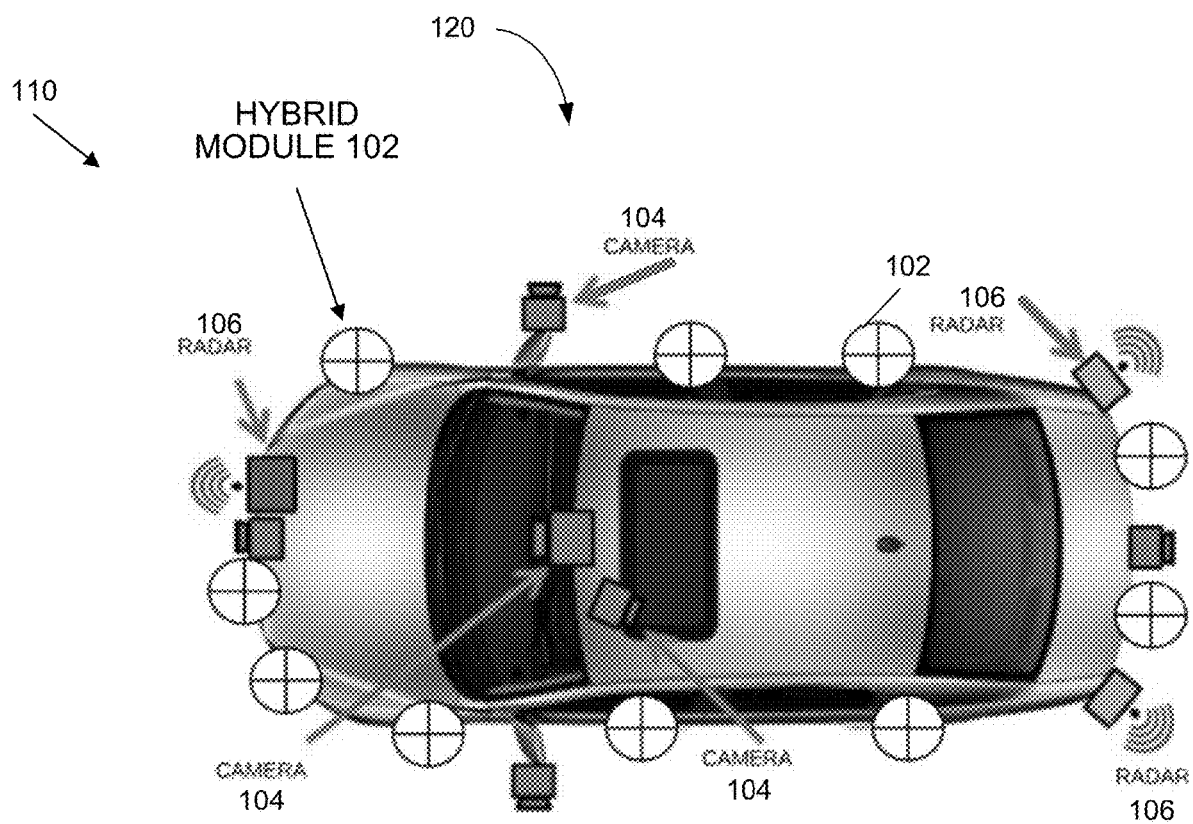
FIG. 1B illustrates the hybrid edge network of FIG. 1A incorporated into a vehicle, according to various examples.

FIG. 1B illustrates the hybrid edge network 110 of FIG. 1A incorporated into a vehicle 120, according to various examples. In FIG. 1B, the vehicle 120 is shown to comprises a variety of sensors (e.g., radar sensors, camera sensors, and hybrid sensor modules) positioned about the vehicle 120 to realize the environmental conditions and activities in the vicinity of the vehicle 120. In particular, the vehicle 120 includes radar sensors, such as radar units 106; camera sensors, such as cameras 104; and the hybrid edge network 110 of hybrid sensor modules, such as the hybrid modules 102. The sensors (e.g., radar sensors and/or camera sensors) of the hybrid modules 102 have specific functions and operate through a sensor fusion (e.g., refer to 202 of FIG. 2) that receives and interprets the sensor data to provide instructions to the driver and/or vehicle 120, and also to control the vehicle 120 and/or the sensors. The hybrid modules 102 form the hybrid edge network 110 that is positioned around the vehicle 120. Some of the hybrid modules 102 are connected to one or more of the other hybrid modules 102 for communication and data sharing.

The hybrid modules 102 are locally independent having computational capabilities to respond to conditions with low-latency. This allows for rapid control, without incurring the costs of storing and managing large amounts of data. As illustrated, the hybrid modules 102 may be positioned around the vehicle 120 to accomplish a planned accumulation of information. In one or more examples, the hybrid modules 102 may employ sensors that incorporate wireless RF, ultrasonic, optical, or infrared sensing; light grids; a wireless magnetometer; an alarm; a Doppler radar; a motion detector; an occupancy sensor; a proximity sensor; a door opening sensor; a speed sensor; a temperature sensor and so forth.

In FIG. 1B, the vehicle that the hybrid edge network 110 is shown to be incorporated into is depicted as an automobile. It should be noted that, in other examples, the hybrid edge network 110 may be incorporated in other types of vehicles other than an automobile including, but not limited to, other terrestrial vehicles (e.g., trucks, tanks, and unmanned ground vehicles (UGVs)), airborne vehicles (e.g., aircraft and unmanned aerial vehicles (UAVs)), and marine vehicles (e.g., boats and unmanned surface vehicles (USVs)).

Figure 1C:
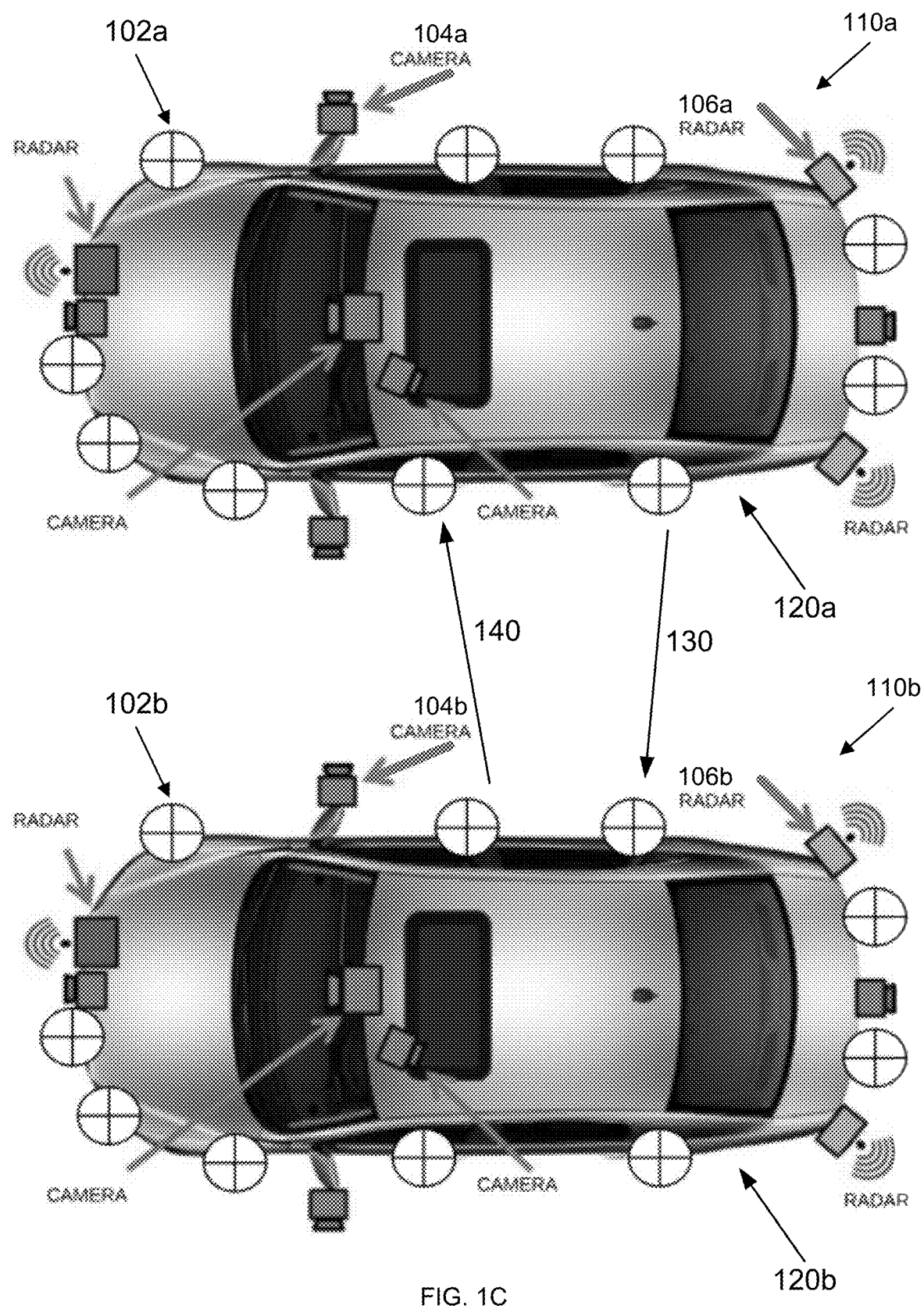
FIG. 1C illustrates two hybrid edge networks, each incorporated into a respective vehicle, in communication with one other, according to various examples.

FIG. 1C illustrates two hybrid edge networks 110a, 110b, each incorporated into a respective vehicle 120a, 120b, in communication with one other, according to various examples. In some examples, the hybrid modules 102a, 102b on different vehicles 120a, 120b may be connected (e.g., wirelessly) with each other for communication and data sharing. For example, in this figure, one hybrid module 102a on a first vehicle 120a is illustrated as transmitting a first signal 130 (e.g., a RF or optical signal) to a hybrid module 102b on a second vehicle 120b. Also, another hybrid module 102b on the second vehicle 120b is shown to be transmitting a second signal 140 (e.g., a RF or optical signal) to another hybrid module 102a on the first vehicle 120a. In some examples, the signals (e.g., the first signal 130 and the second signal 140) may comprise informational data relating to environmental conditions, activities, and obstacles in the vicinity of each of the vehicles 120a, 120b. This additional information may be used (in combination with other sensor data) by modules (e.g., perception modules/engines, such as perception module 436 of FIG. 4, camera artificial intelligence (AI) engine 912 of FIG. 9, and/or radar AI engine 922 of FIG. 9) on the vehicles 120a, 120b to aid in the determination of at least one object (e.g., target) in the vicinity of the vehicles 120a, 120b.

Figure 2:
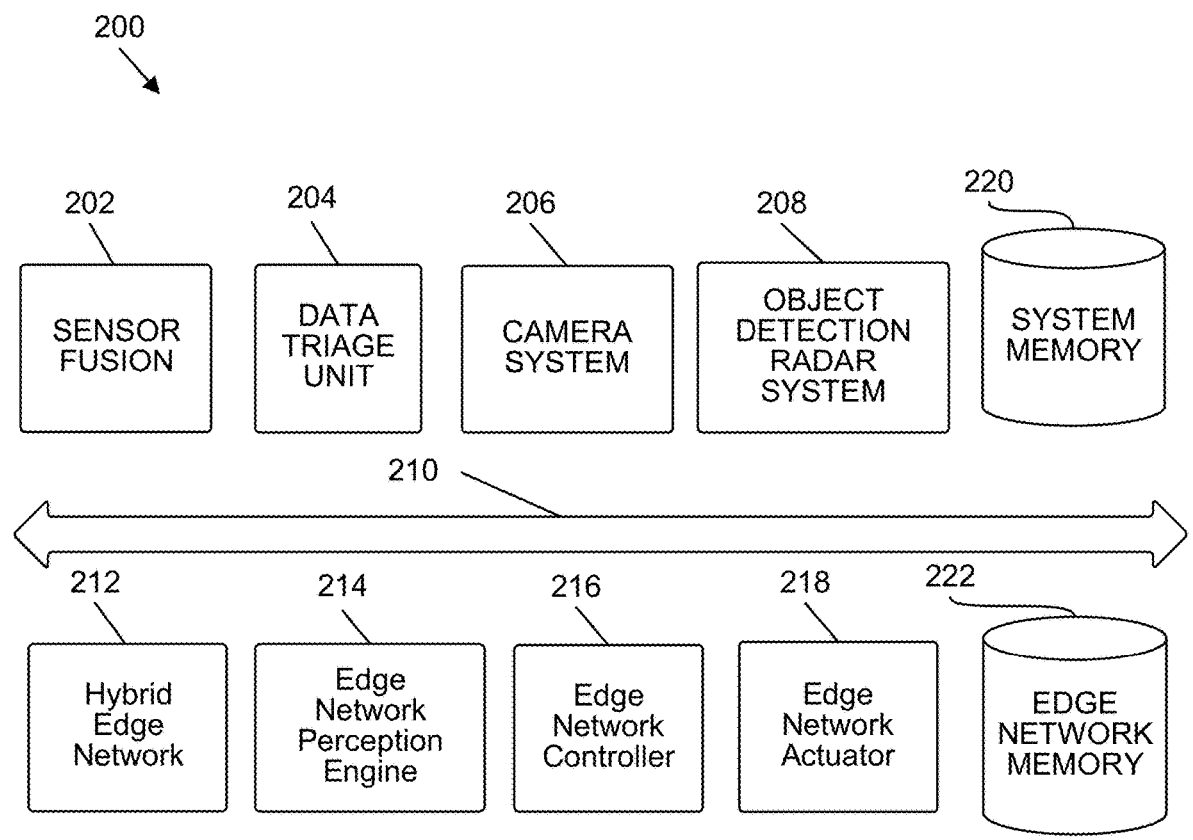
FIG. 2 illustrates a system for a hybrid edge network, according to various examples.

FIG. 2 illustrates a system 200 for a hybrid edge network 212, according to various examples. In FIG. 2, the system 200 (i.e. a hybrid edge system) is shown to comprise a sensor fusion 202, a data triage unit 204 to filter out spurious or incompatible data, a camera system 206, an object detection radar system 208, a system memory 220 to store data, a communication bus 210, a hybrid edge network 212 comprising hybrid modules (e.g., refer to 102 of FIG. 1B), an edge perception module 214, an edge network controller 216, an edge network actuator 218, and an edge network memory 222.

In one or more examples, the hybrid edge system 200 is incorporated within a vehicle (e.g., refer to 120 of FIG. 1B). The object detection radar system 208 is configured to send data and information to the central sensor fusion 202, which receives information from multiple hybrid modules (e.g., refer to 102 of FIG. 1B) positioned throughout the vehicle. The hybrid edge network 212 is made up of the plurality of hybrid modules (e.g., refer to 102 of FIG. 1B), which each comprise sensors (e.g., radar and/or camera sensors). The sensed data from the sensors of hybrid modules is provided as input to the edge network perception engine 214, which may have separate processing engines or paths for camera and radar data, or may have a combined engine to process the data. The edge network perception engine 214 uses the data to identify objects and classify the same within the environment and, specifically, near the edges or focused areas of the vehicle.

The edge network perception engine 214 outputs the classifications of the detected objects, such as detected vehicles. The edge network perception engine 214 provides the parameter data detected by the individual sensors, such as range, size, velocity, and so forth to the edge network controller 216. In one or more examples, the specific parameter set and classification scheme are determined by the application, placement of sensor, target object type and so forth.

The edge network controller 216 has the computational ability to determine, based on the data from the edge network perception engine 214, if an action is to be taken by the local hybrid edge network 212, and to instruct an edge network actuator 218 to take action in the vehicle, if needed. The edge network controller 216 in the illustrated example may send a message, or data, to the sensor fusion 202 based on the results received from the hybrid edge network 212. The hybrid edge network 212 acts as a local, independent system, and is able to make some local decisions without accessing the sensor fusion 202. The edge network controller 216 stores information, such as raw data, perceptions, and so forth in the edge network memory 222.

Figure 3:
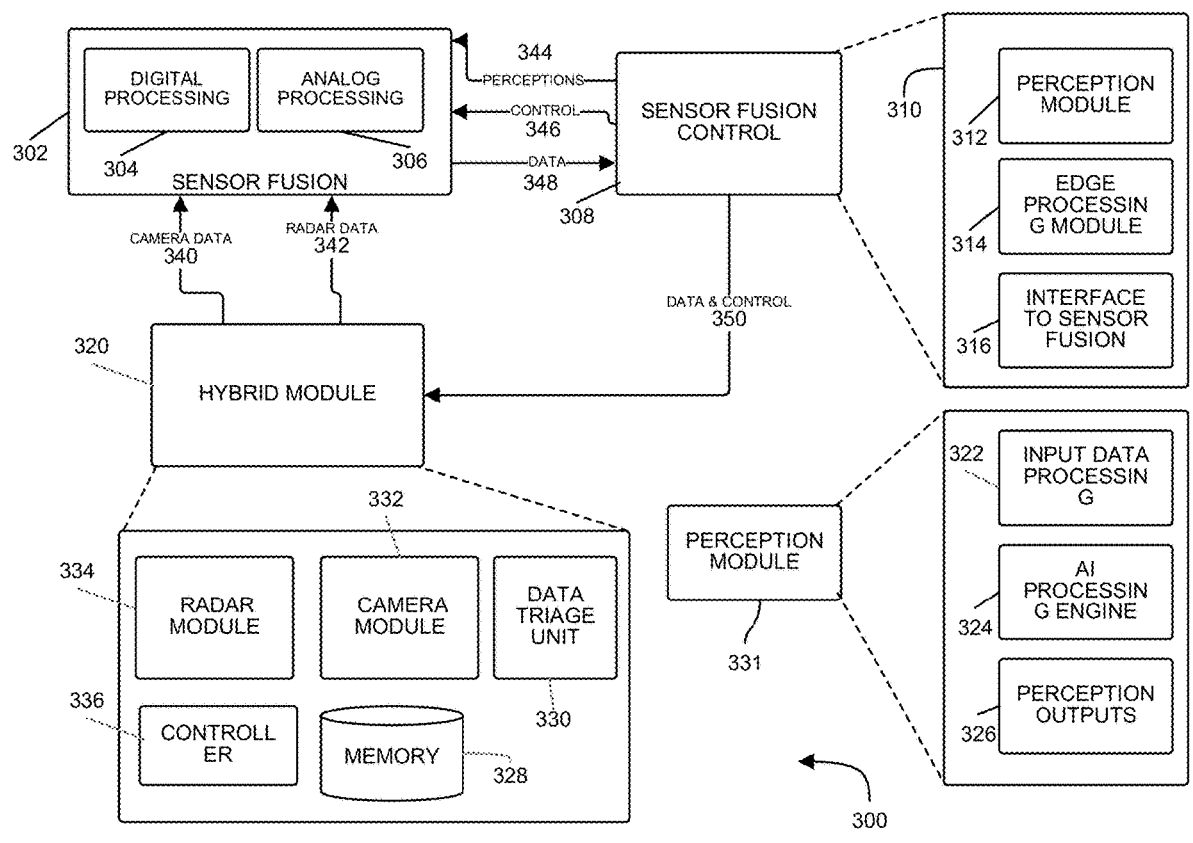
FIG. 3 illustrates a portion of a hybrid edge network and a sensor fusion system, according to various examples.

FIG. 3 illustrates a portion of a hybrid edge network and a sensor fusion system 300, according to various examples. In particular, FIG. 3 illustrates a sensor system 300 comprising a hybrid module 320 and a central sensor fusion 302. The hybrid module 320 may comprise a single sensor (e.g., a radar module 334 or a camera module 332) or may comprise a network of sensors, which may include the same type or different types of sensors (e.g., radar modules 334 and camera modules 332). In addition, the hybrid module 320 may comprise a data triage unit 330 to filter out spurious or incompatible data, a controller 336 to control the operation of the hybrid module 320 (e.g., to control the sensors), and memory 328 to store data.

As described herein, the network of sensors (e.g., radar modules 334 and/or camera modules 332) may be positioned as edge sensors, meaning that they are positioned in situ (e.g., about a vehicle) to have limited independent functionality. During operation, the sensors sense information (e.g., radar data is sensed by a radar module 334 or camera (image or video) data captured by a camera module 332) from their environment. The hybrid module 320 provides the sensed information (e.g., camera data 340 and/or radar data 342 in the form of raw data, processed data, perception information, or a combination thereof) to the sensor fusion 302. The term "sensor fusion" as used herein refers to a central control center for multiple sensors, such as in at least one hybrid module (e.g., hybrid module 320) positioned on a vehicle. In some examples, the data triage unit 330 processes the sensed information from the sensors to generate processed data (e.g., camera data 340 and/or radar data 342), which is input into the sensor fusion 302.

The sensor fusion 302 then processes (by digital processing 302 and/or analog processing 306) the sensed information (e.g., camera data 340 and/or radar data 342) it receives from the hybrid module 320 to generate input data 348 for the sensor fusion control 308. In the implementation of FIG. 3, the sensor fusion 302 includes digital processing 304 as well as analog processing 306, but may consist of one or the other in alternate implementations.

The sensor fusion 302 is coupled to the sensor fusion control 308 for control 346 of processing of the sensor fusion 302. The sensor fusion control 308 includes a first perception module 312 to determine the target and classification, and an edge processing module 314 to analyze the information from the sensors of the hybrid module 320. The target is an object in the environment that is detected, such as a vehicle, cyclist, road sign, and others.

The sensor fusion control 308 receives the generated input data 348 from the sensor fusion 302. The edge processing module 314 of the sensor fusion control 308 analyzes the data 348 from the sensor fusion 302 to generate analyzed data. The first perception module 312, based on the analyzed data from the edge processing module 314, generates and provides perceptions (or target information) 344 and control information 346 to the sensor fusion 302.

The sensor fusion control 308 also includes an interface to sensor fusion 316, which provides information between the modules within the sensor fusion control 308 and the modules of the sensor fusion 302. In some examples, the interface to sensor fusion 316 may provide the format for data that is to be input into the first perception module 312 and the format of information to provide perception information 344 to the sensor fusion 302. In each situation, the first perception module 312 analyzes the received information and inputs the perceptions 344 into the central sensor fusion module 302. In some examples, the first perception module 312 accesses the data triage unit 330 and/or memory 328 of the hybrid module 320. In addition, the hybrid module 320 receives feedback and/or instructions (e.g., control 350, such as controlling to adjust a beamwidth of and/or to steer a beam (e.g., containing RF or optical signals) generated by an antenna of the radar module 334, and controlling to focus and/or steer light by a lens of the camera module 332) from the sensor fusion control module 308.

In each scenario, camera information (e.g., camera data 340) and radar information (e.g., radar data 342) may be inputted into separate perception engines, artificial intelligence (AI) engines, or combined into a common perception engine. For example, perception outputs (from the sensor fusion control 308) are provided into AI engines (e.g., first perception module 312) specifically trained (e.g., via various different types of machine learning techniques) on the type of data input. For example, for camera data 340, the first perception module 312 is trained on camera data 340 (e.g., on previous camera data). And, for radar data 342, the first perception module 312 is trained on radar data 342 (e.g., on previous radar data). The trained modules (e.g., the first perception module 312) then output their desired information when presented with newly sensed data. The data is then used to complement each other and provide a more detailed output, which in many cases is greater information than is possible with either perception module individually. Each perception engine acts similar to second perception module 331, which includes input data processing 322 to ensure data is received in a correct format, an AI processing engine 324 to process the data (note that the AI processing engine 324 may be trained on data (e.g., radar data and/or camera data) via various different types of machine learning techniques), and perception outputs 326 to output the perceptions generated from the processed data. As such, the data is processed through trained modules.

Figure 4:
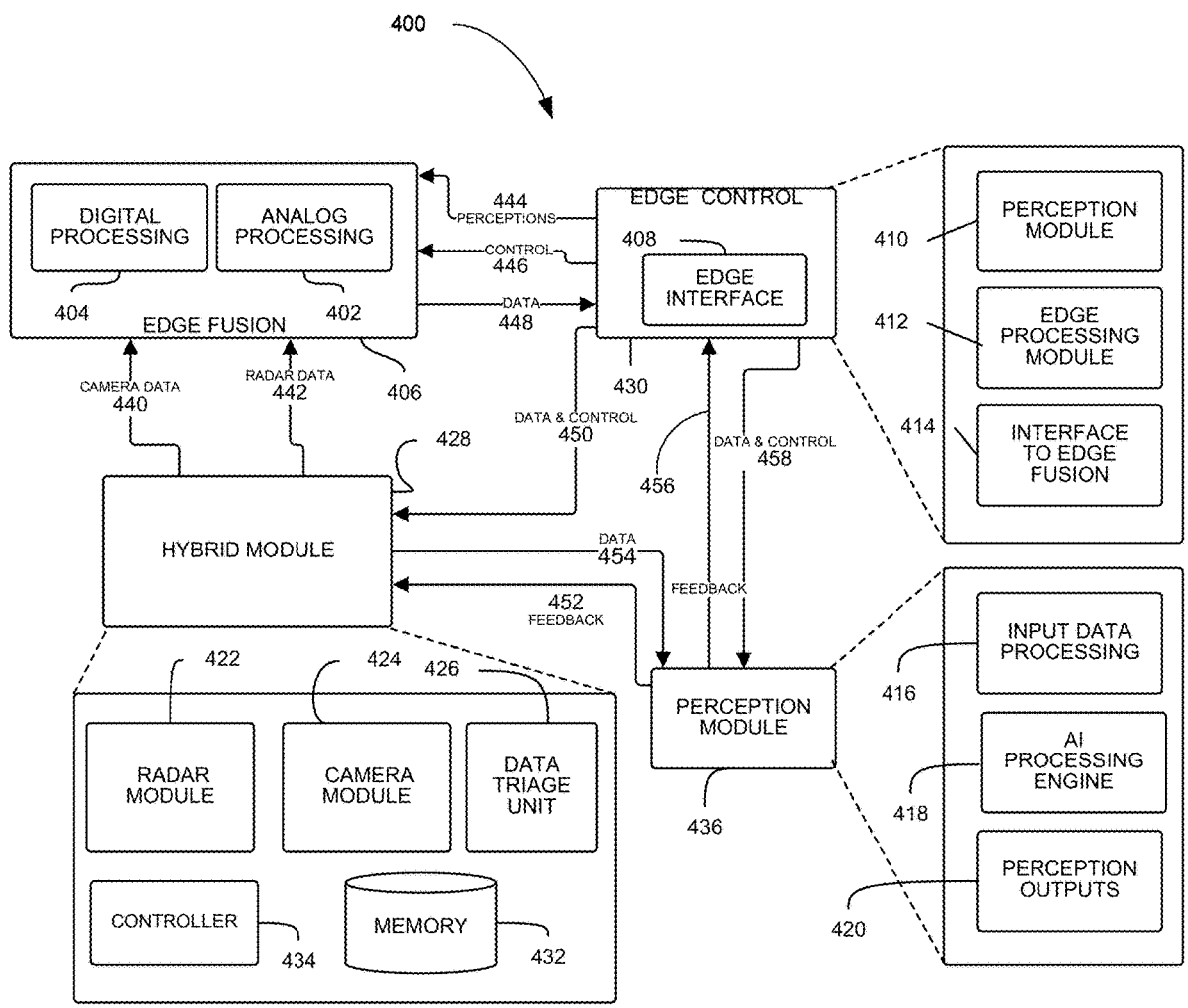
FIG. 4 illustrates a portion of a hybrid edge network and an edge fusion system, according to various examples.

FIG. 4 illustrates a portion of a hybrid edge network and an edge fusion system 400, according to various examples. In particular, FIG. 4 illustrates a hybrid module 428 operable independently within the hybrid edge network. The hybrid module 428 includes a radar module 422 and a camera module 424, but may include other sensor modules and any number of different types of sensors. The radar module 422, in some implementations, is a meta-structure antenna module (e.g., refer to radar module 1000 in FIG. 10). The radar module 422 may include radar of various different range capabilities (e.g., short-range radar such that the radar may capture environmental information near the vehicle, and/or long-range radar). In addition, the radar module 422 may include radar that radiates at various different beamwidths, and that may have adjustable beamwidths. The data from the radar module 422 can be used to identify the location and velocity of an object (e.g., a target), and may be used by a perception engine (e.g., first perception module 410 or second perception module 436) to identify or classify the object.

The camera module 424 comprises a camera capable to capture an image and/or video. In one or more examples, the camera may be capable to capture visible, infrared (IR), and/or long-wave IR images and/or video. The image or video may be digitized to which various different types of image recognition techniques can be performed to provide information as to edge detected objects, signals, markings, and so forth. In some examples, the camera module 424 can be used to track road markings to ensure that the vehicle is staying within in the lanes of the road, moving properly, and so forth. In some examples, the road markings provide information such as speed limits, construction, and so forth. This information is easily recognized by the camera or video detection means, but may be read or interpreted by other modules, such as a scanner to read coded information, such as quick response (QR) codes on street signs, and so forth.

Also included within the hybrid module 428 is a data triage unit 426 that is tasked with filtering out spurious readings and other data (within the sensed data captured by the radar module 422 and/or the camera module 424) that are identified as not relevant to the perception processing. The hybrid module 428 is controlled (e.g., the sensors are controlled) by its local controller 434, and data is stored within its memory 432. The data may include operational information, look up tables, mappings, and other information to better operate the various edge sensors (e.g., radar module 422 and/or camera module 424). The hybrid module 428 interfaces with an edge fusion 406, which performs digital processing 404 adapted to process digital data (such as camera data 440 from the camera module 424 and radar data 442 from the radar module 422) and analog processing 402 to process analog data (such as radar data 442 from the radar module 422).

During operation, the sensors operate independently, with the radar module 422 having an antenna configuration for radar operation (e.g., obtaining radar data), and the camera module 424 capturing visual (image) and/or video data. The data triage unit 426 of the hybrid module 428 is adapted to identify information in the sensed information that is not accurate and that may hinder operation of the hybrid module 428. The hybrid module 428 processes the sensed information for the edge fusion 406, and provides this processed information (e.g., camera data 440 and/or radar data 442 in the form of raw data, processed data, perception information, or a combination thereof) to the edge fusion 406 for processing (e.g., digital processing 404 and/or analog processing 402) therein. The edge fusion 406 controls the processing of the digital and/or analog data and, in some cases, may combine the two types of data.

Also, in the system 400, an edge control 430 includes an edge interface 408 to communicate with other modules within system 400. In some examples, the edge interface operates as an interface for communication between the edge fusion 406 and the hybrid module 428. The edge interface 408 also prepares data for communication with the other modules. For example, the edge control 430 receives data from the edge fusion 406 including, but not limited to, processed radar data, camera data, and other information from the hybrid module 428. The edge interface 408 of the edge control 430 processes this data to generate input data for the second perception module 436, which acts to interpret the information received from the various sensors.

The edge control 430 provides data (e.g., processed data) and control information 458 to the second perception module 436. The second perception module 436 is a machine learning or AI system that acts on sets of training data to develop a perception response to real time and current data. The training sets are based on the type of information and data available to the second perception module 436 from the hybrid module 428. In some scenarios, the hybrid module 428 may enable a single type of sensor and, in other scenarios, may enable multiple types of sensors. This information 458 (e.g., sensor information) is prepared for the second perception module 436 by the edge fusion 406. The edge interface 408 of the edge control 430 provides control (e.g., control information) 450, 458 to the hybrid module 428 and to the second perception module 436. In some examples, the control 450 sent to the hybrid module 428 may steer and/or change a beamwidth of a beam (e.g., comprising RF or optical signals) radiated by an antenna of the radar module 422, or may steer and/or focus light by a lens of the camera module 424.

Similarly, the edge interface 408 provides data 458 to and receives feedback 456 from the second perception module 436. The second perception module 436 also provides feedback 452 to the hybrid module 428, where the feedback 452 provides detected object/target classifications and/or identifications, and may indicate the certainty of the same. These communications between the hybrid module 428 and the second perception module 436 enable the system 400 responsiveness, such as where the 452 feedback indicates a critical situation, and the hybrid module 428 may activate more sensitive sensors or change a sensor configuration. This direct communication increases the speed of response. Similarly, the hybrid module 428 provides data 454 to the second perception module 436 that may be used to complement an input data set.

The edge control 430 also includes the first perception module 410, which may operate independently of the second perception module 436. The first perception module 410 is designed to provide fast processing at the hybrid edge network without the need for interaction with central processing modules, such as the second perception module 436. The edge control 430 also includes an edge processing module 412 that controls operation and processes the data that the edge control 430 receives. In addition, the edge control 430 includes an interface to sensor fusion 414 for specific communications of data and control as well as for providing perception information from the first perception module 410 and/or the second perception module 436. Note that the second perception module 436 communicates with central modules (not shown) in a radar system, such as a sensor fusion (e.g., refer to 302 in FIG. 3) in a vehicle.

The second perception module 436 includes modules for data for input data processing 416 and perception outputs 420. The core of the second perception module 436 is an AI processing engine 418, which may use information from a variety of sensors and indicators within a vehicle, and is not limited to the edge sensors. However, the second perception module 436 benefits from the edge sensed information obtained by the hybrid module 428.

Figure 5:
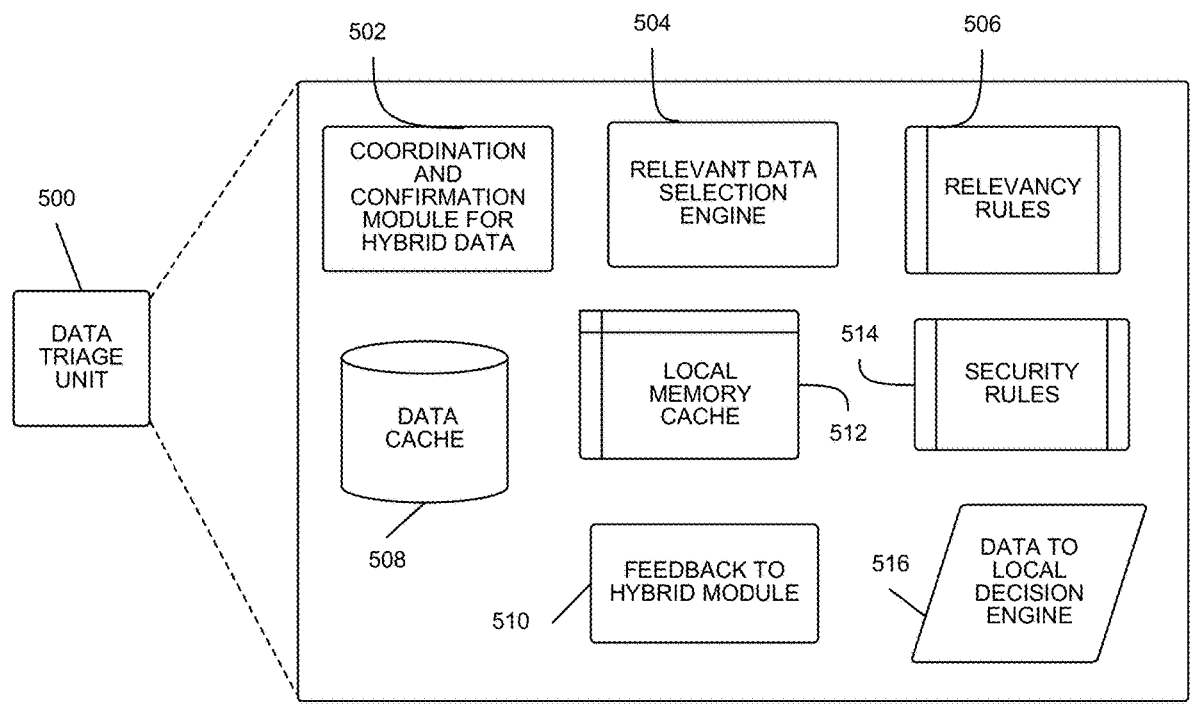
FIG. 5 illustrates a data triage unit, according to various examples.

FIG. 5 illustrates a data triage unit 500, according to various examples. In particular, FIG. 5 illustrates a detailed view of a data triage unit 500, such as data triage unit 330 of hybrid module 320 of system 300 of FIG. 3, or data triage unit 426 of hybrid module 428 of system 400 of FIG. 4. The data triage unit 500 is tasked with filtering spurious or incompatible information obtained from edge sensors (e.g., radar sensors and/or camera sensors) within the hybrid edge network. The data triage unit 500 is also tasked with capturing initial information (e.g., from the sensor data) for major decisions, such as to identify critical situations that require immediate action. The data triage unit 500, in the illustrated example, also separates and sorts the various different types of information, such as according to importance, relevance, or other criteria.

Continuing with data triage unit 500 of FIG. 5, information (e.g., sensor data) is stored in data cache 508 as well as in local memory cache 512. These two cashes are generally used for short-term storage for edge processing, but may include information that is maintained over time, such as information used to build a knowledge or rule database. As part of triage, relevant data (e.g., from the sensor data) is identified by a relevant data selection engine 504, which makes such selection according to relevancy rules 506. The system and application determine the relevancy rules 506, which may be modified over time. In some scenarios, the relevancy rules 506 are adjusted based on the sensed data, the location of the vehicle, and so forth.

All operation within the data triage unit 500 is subject to security rules 514, which include custom rules as well as regulations and other guidance. The data triage unit 500 stores, processes, and provides data for use in edge processing as well as for use in central vehicle processing. In the data triage unit 500, data is also stored in the data to local decision engine 516, which stores data that is intended for a local decision engine. The information received, processed, and output from data triage unit 500 is coordinated by the coordination and confirmation module for hybrid data 502, which acts to confirm the sensor data.

Figure 6:
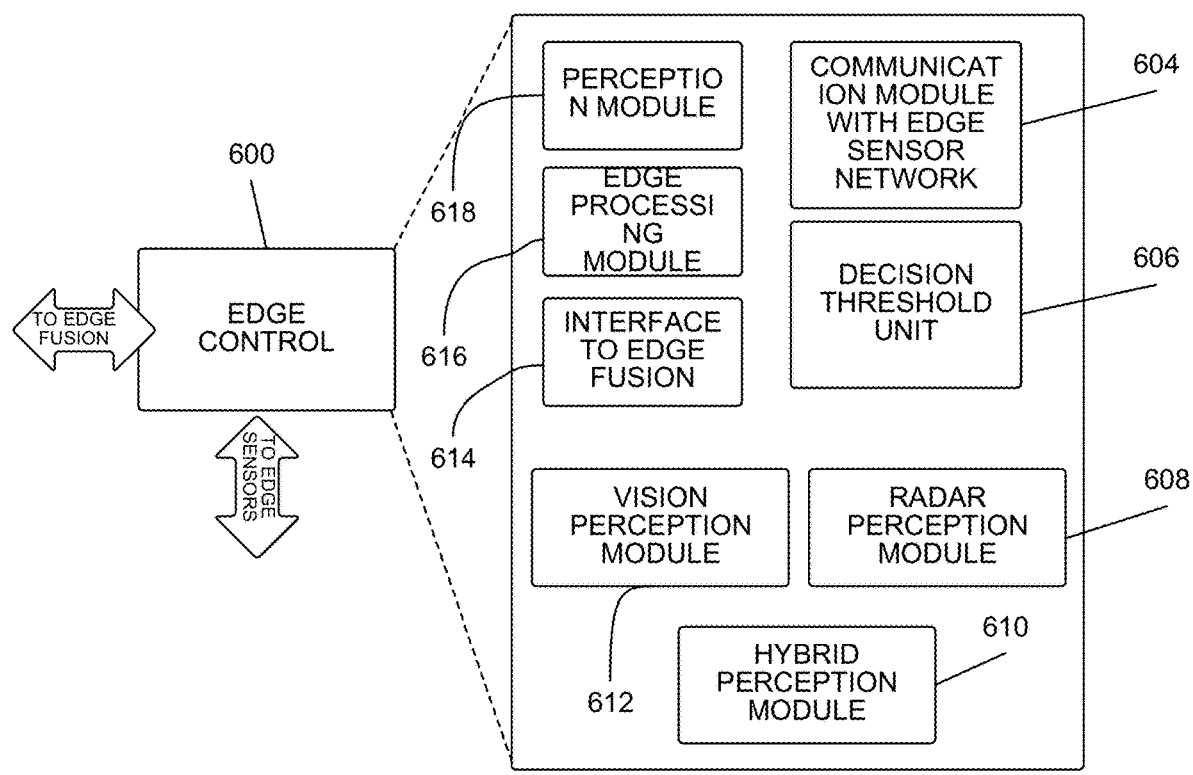
FIG. 6 illustrates an edge control module, according to various examples.

FIG. 6 illustrates an edge control module 600, according to various examples. In particular, FIG. 6 illustrates a detailed view of an edge control module 600, such as edge control 430 of system 400 of FIG. 4. As indicated, edge control module 600 communicates with an edge fusion module (e.g., edge fusion module 406 of FIG. 4) and edge sensors (e.g., hybrid module 428 of FIG. 4). The edge control module 600 includes a perception module 618, an edge processing module 616, and an interface to edge fusion 614 (e.g., refer to the edge interface 408 of FIG. 4). The edge control module 406 also includes a communication module with edge sensor network 604 for communicating with the edge sensor network components. In addition, the edge control module 406 includes a decision threshold unit 606, which compares the sensed data to predefined or real-time generated data thresholds, and makes decisions according to the results of the comparisons.

Also, the edge control module 406 includes a plurality of perception modules, which include a radar perception module 608, a vision perception module 612, and a hybrid perception module 610. The perception modules enable individual perception processing (e.g., generating perceptions based on the processing of only camera data or radar data) and/or hybrid perception processing (e.g., generating perceptions based on the processing of both the camera data and the radar data). Using the different options for perception processing provides fast response times, which are critical for edge processing. In some examples, each of these perception modules may incorporate a different machine learning (ML) or AI architecture. The training of the perception modules is done prior to operation, and in some implementations, the training continues during operation.

Figure 7:
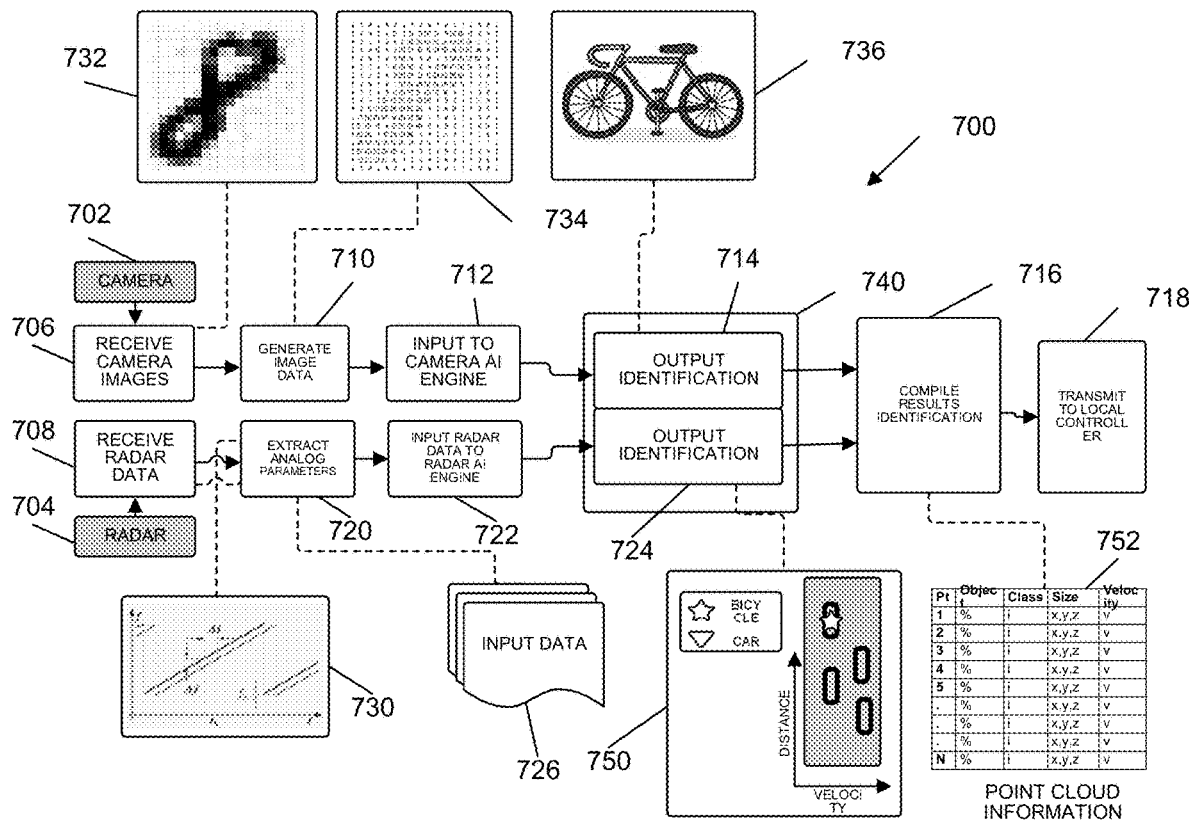
FIG. 7 illustrates a hybrid sensor system, according to various examples.

FIG. 7 illustrates a hybrid sensor system, according to various examples. In particular, FIG. 7 illustrates a process 700 flow of an example operation of the hybrid sensor system. The process 700 captures images from camera and radar sensors 702, 704, processing them in parallel and combining them to optimize results. At the start of the process 700, camera images (camera data) are first received at the camera module 706 from the camera sensor 702. The image captured by the camera sensor 702 is illustrated as image 732. Digitizing module 710 then digitizes the image 732 to generate digital image data, which is illustrated as digitized data 734. The digitized data 734 is provided to a camera AI engine 712. The camera AI engine 712 is a perception engine that identifies the detected object (e.g., target) in the digitized data as a bicycle. The identification of the detected object (e.g., a bicycle 736) is output from output identification module 714.

In parallel with the camera sensor processing, radar data is received by radar data module 708 from the radar sensor 704. The information obtained by the radar sensor 704 identifies range and velocity information of the object, such as from Doppler calculations of a frequency-modulated continuous-wave (FMCW) signal (e.g., as illustrated in the exemplary Range-Doppler map 730). Extraction module 720 extracts analog parameters from radar data, which is in the format for input data 726 to a perception engine. The Range-Doppler map 730 is generated from the extracted radar data. The extracted radar data is then input into radar AI engine 722. The AI engine 722 evaluates the extracted radar data to determine object location and velocity information. The determined object location and velocity information are then outputted from output identification module 724. An example of the information outputted from the output identification module 724 is shown in image 750, which shows the location of the bicycle within a plot of velocity versus distance.

Output identification module 724 is part of the hybrid identification module 740, which also includes output identification module 714. As such, output from each of the AI engines 712, 722 is provided to the hybrid identification module 740, and specifically to the output identification modules 714, 724, respectively.

The information outputted by output identification modules 714, 724 is available for further processing, either individually by format (e.g., camera or radar) or in combination (e.g., both camera and radar). The information is inputted into a compiled results identification module 716, which formats the information into a mapping of information, such as in a point cloud mapping comprising point cloud information 752. In the mapping of the point cloud information 752, for each point in the point cloud, an object is identified with a certainty and class. The position and velocity of an object at each point is associated as well. The point cloud information 752 is transmitted to a local controller 718. The point cloud information 752 may be used by the edge fusion (e.g., refer to edge fusion 406 of FIG. 4) or by a central sensor fusion (e.g., refer to sensor fusion 302 of FIG. 3) to interpret the environmental condition of the vehicle, and determine actions to take in response.

Figure 8:
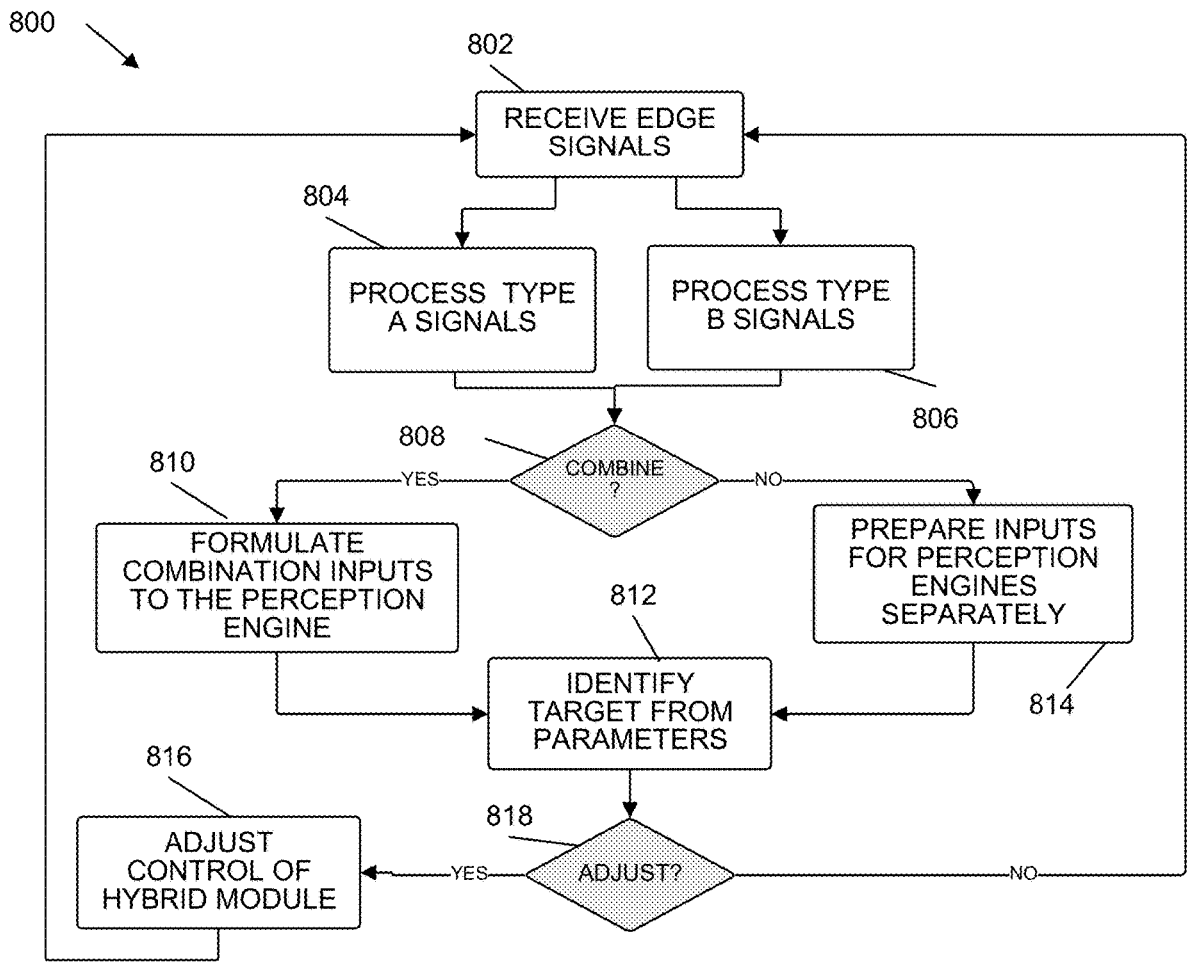
FIG. 8 illustrates a process for edge processing, according to various examples.

FIG. 8 illustrates a process 800 for edge processing, according to various examples. The process 800 of FIG. 8 is similar to the process 700 of FIG. 7. At the start of the process 800, edge sensor signals (e.g., signals comprising sensor data, such as camera data and radar data) are received 802. The signals may be of a variety of formats. As described herein, there are two types of signals (e.g., camera signals and radar signals), but alternate implementations may employ any number of different types of sensors and information formats. In the present process 800, a first type of sensor signal, type A (e.g., a camera signal), is processed 804. And, a second type of sensor signal, type B (e.g., a radar signal), is processed 806.

Then, it is determined if the processed signals (e.g., the processed radar signal and the processed camera signal) can be combined 808. If the processed signals can be combined, the process 800 proceeds to formulate combination inputs (based on a combination of the processed signals) for a perception engine 810. However, if the processed signals cannot be combined, then the process 800 proceeds to separately prepare inputs for perception engines 814. Then, a perception engine(s) uses the inputs to identify the targets by using parameters 812.

Then, it is determined whether the hybrid module sensors (e.g., camera sensor and/or radar sensor) need to be adjusted 818. If it is determined that the sensors do not need to be adjusted, the process 800 proceeds back to step 802. However, if it is determined that the sensors need to be adjusted, the process 800 proceeds to adjust the control of the hybrid module such that the sensor(s) is adjusted accordingly 816. Then, the process 800 proceeds back to step 802.

Figure 9:
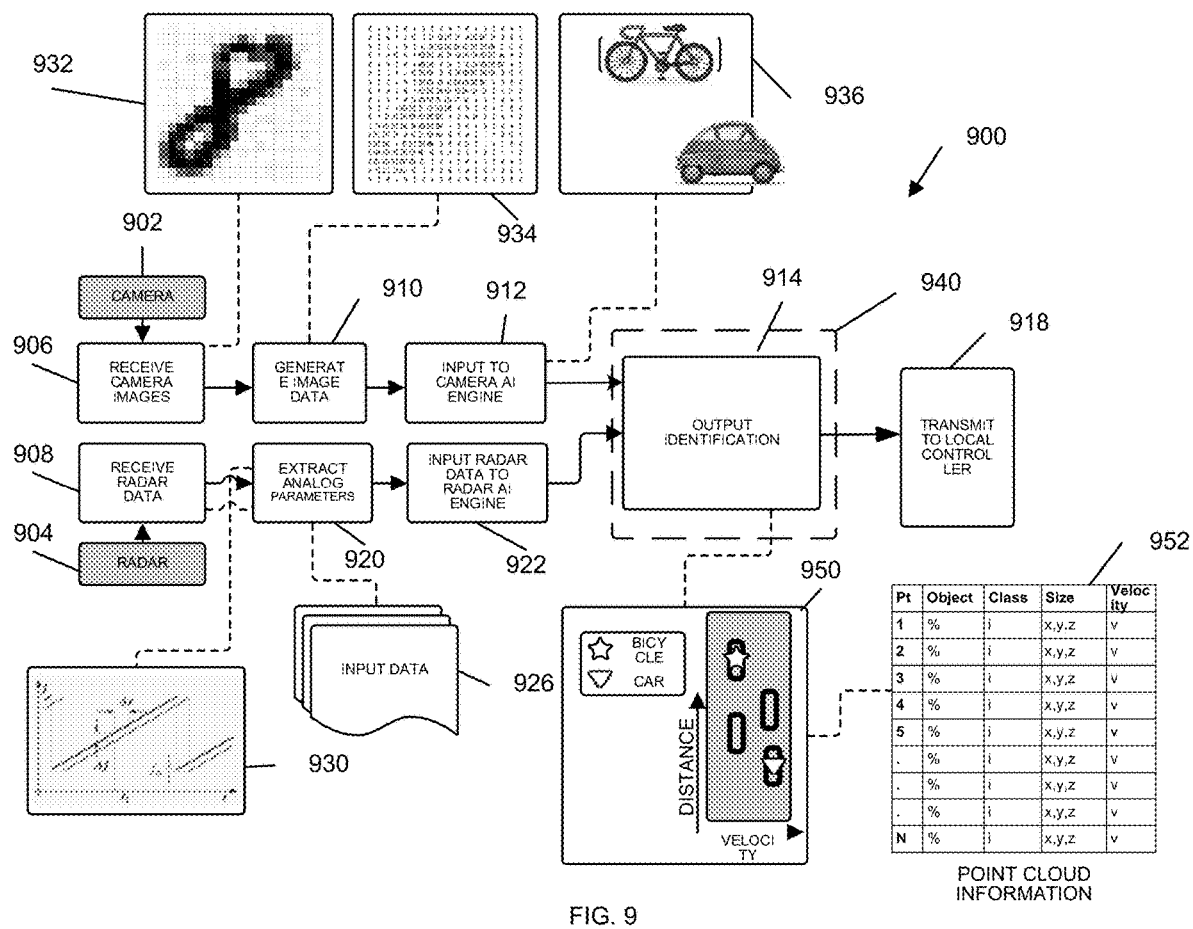
FIG. 9 illustrates a hybrid sensor system, according to various examples.

FIG. 9 illustrates a hybrid sensor system, according to various examples. In particular, FIG. 9 illustrates another process 900 flow of an example operation of the hybrid sensor system in which there are two targets identified, which are identified as a bicycle and a car (refer to 936). Similar to the process 700 of FIG. 7, the process 900 captures images from camera and radar sensors 902, 904, processing them in parallel and combining them (e.g., in the output identification module 914) to optimize the results.

At the start of the process 900, camera images (camera data) are received at the camera module 906 from the camera sensor 902. Image 932 shows the image captured by camera sensor 902. Then, digitizing module 910 digitizes the image 932 to generate digital image data, illustrated as digitized data 934. A camera AI engine 912 then receives the digitized data 934. The camera AI engine 912 is a perception engine that uses the digitized data to identify the detected objects (e.g., targets) to be a bicycle and a car. The identification of the detected objects (e.g., a bicycle and a car 936) is output from output identification module 914.

In parallel, radar data is received by radar data module 908 from the radar sensor 904. The radar data information obtained by the radar sensor 904 is used to identify a range and velocity of each of the objects, such as from Doppler calculations of FMCW signals (e.g., as shown in the exemplary Range-Doppler map 930).

Also, extraction module 920 extracts analog parameters from the radar data, which is in the format for input data 926 for a perception engine. The Range-Doppler map 930 is generated from the extracted radar data. Then, the extracted radar data is input into a radar AI engine 922. The AI engine 922 evaluates the extracted radar data to determine location and velocity information for each of the detected objects. Then, the determined location and velocity information for the objects are outputted from output identification module 914. An example of the information outputted from the output identification module 914 is shown in image 950, which shows the locations of the bicycle and car within a plot of velocity versus distance. The information outputted from the output identification module 914 is mapped in a point cloud mapping comprising point cloud information 952. In the mapping of the point cloud information 952, for each point in the point cloud, the objects are each identified with a certainty and class, and the position and velocity of each of the objects at each point is also associated.

Output identification module 914 is part of the hybrid identification module 940. A combination of output from both of the AI engines 912, 922 is provided to the output identification module 914 of the hybrid identification module 940. The information outputted by output identification module 914 is available for further processing.

Also, the information outputted from the output identification module 914 is transmitted to a local controller 918, which may use the information to interpret the environmental condition of the vehicle, and to determine specific actions to take in response.

Figure 10:
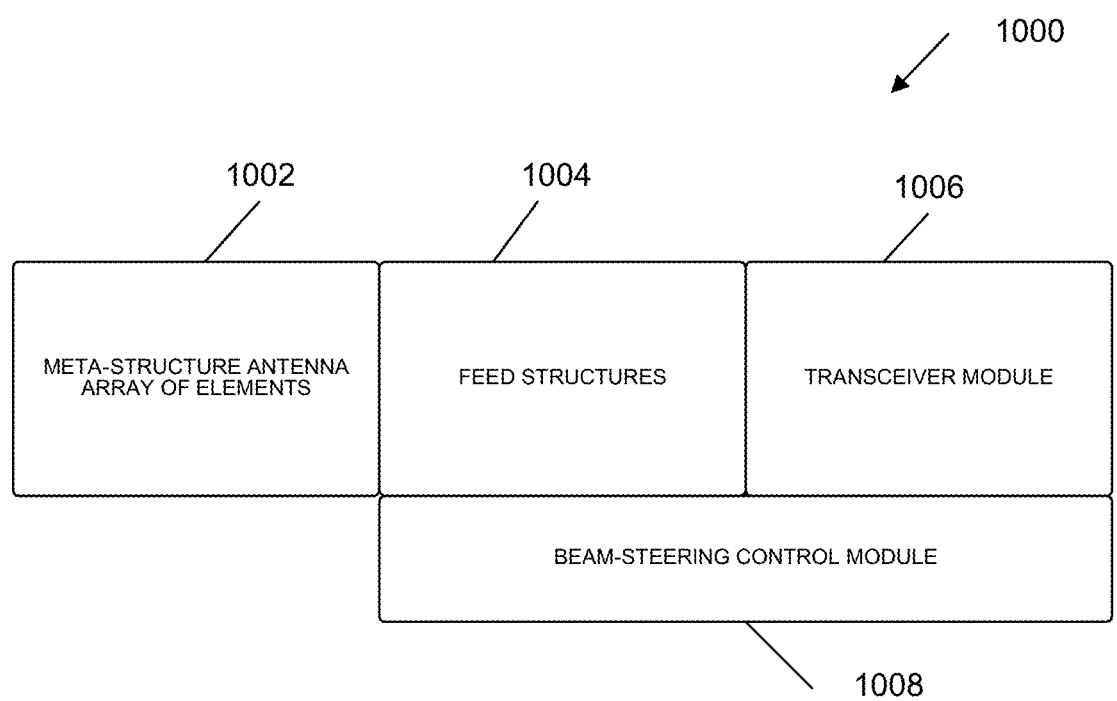
FIG. 10 illustrates a radar module having meta-structures, according to various examples.

FIG. 10 illustrates a radar module 1000 having meta-structures, according to various examples. Specifically, FIG. 10 illustrates a radar module 1000 having an array of meta-structure antenna elements 1002, which are engineered structures with electromagnetic (EM) properties not found in nature. Meta-structures may take a variety of forms where the design and configuration manipulate the phase of an electromagnetic (EM) wave as a function of frequency and spatial distribution resulting in frequency and spatial dispersion changes, thus changing the phase of EM wave. The change in phase of the radiating elements enables control of the direction and gain of the radiated beam so as to enable beam steering through beam steering control module 1008. Signals for transmission are prepared by a transceiver module 1006, which may also receive and convert received reflections. The signals propagate between the transceiver module 1006 and the meta-structure antenna array of elements 1002 through a feed structure 1004 that acts as a power divider or other corporate structure spreading a signal out across the elements of the antenna array 1002. In some implementations, the feed structure 1004 is designed to taper the power delivered to different areas of the array 1002, such as to lower the power to the edges of the antenna array 1002. In some implementations, the beam steering control module 1008 operates in coordination with the feed structure 1004 to control power to the antenna array 1002.

Edge processing enables rapid identification of conditions to guide a vehicle. There may be any number of sensors of various different types positioned along the perimeter of the vehicle. These sensors include processing at the edges in addition to providing information to other processing modules, such as a sensor fusion (e.g., refer to a sensor fusion 302 of FIG. 3). The edge signals (containing sensor data) may be individually processed to identify and/or classify objects (e.g., targets) or may be processed in combination.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate examples can also be implemented in combination in a single example. Conversely, various features that are described in the context of a single example can also be implemented in multiple examples separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims without departing from the true spirit and scope of this disclosure. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Additionally, parts of operations may be performed concurrently in a parallel process when possible, as well as performed sequentially. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

We claim:

1. A radar system, comprising:
   a first sensor module;
   a second sensor module;
   a memory storage unit; and at least one processing unit adapted to perform the operations of:
receiving a first set of data from the first sensor module;
receiving a second set of data from the second sensor module;
analyzing the first set of data;
analyzing the second set of data;
digitizing the first and second sets of data;
performing object recognition on the first and second sets of data;
combining the analyzed first and second sets of data; and
identifying at least one target based on the combined analyzed sets of data.

2. The radar system of claim 1, wherein the first sensor module and the second sensor module are positioned on a perimeter of a vehicle, and the first set of data identifies road markings.

3. The radar system of claim 2, wherein the vehicle is one of a terrestrial vehicle, a marine vehicle, or an airborne vehicle.

4. The radar system of claim 2, wherein the vehicle is an autonomous vehicle.

5. The radar system of claim 1, wherein the operations further comprise identifying specific types of information from the first sensor module and the second sensor module.

6. The radar system of claim 1, wherein the operations further comprise processing data from output of the first sensor module and data from output of the second sensor module and performing data fusion for edge sensor data.

7. The radar system of claim 1, wherein the operations further comprise outputting the combined analyzed sets of data in a point cloud format.

8. The radar system of claim 1, wherein the first sensor module is a camera module, and the second sensor module is a radar module.

9. The radar system of claim 8, wherein the operations further comprise:
digitizing camera data from the camera module and generating digitized data based on the digitized camera data; and
interpreting radar data from the radar module and generating a Range-Doppler map based on the interpreted radar data.

10. The radar system of claim 8, wherein the radar module comprises a meta-structure array of antenna elements.

11. A method for environmental perception of a vehicle, comprising:
generating first sensor data;
generating second sensor data;
processing the first sensor data;
generating a first classification output based on the processing of the first sensor data;
processing the second sensor data;
digitizing the first and second sensor data;
generating a second classification output based on the processing of the second sensor data;
combining and interpreting the first classification output and the second classification output; and
identifying at least one target based on the combined first and second classification outputs.

12. The method of claim 11, further comprising:
sensing first sensor information, wherein the generating of the first sensor data comprises processing the first sensor information; and
sensing second sensor information, wherein the generating of the second sensor data comprises processing the second sensor information.

13. The method of claim 12, wherein the generating of the first sensor data further comprises filtering out spurious data from the first sensor information, and the generating of the second sensor data further comprises filtering out spurious data from the second sensor information.

14. The method of claim 12, wherein the sensing of the first sensor information is performed by a camera sensor, and wherein the method further comprises controlling the camera sensor to at least one of focusing light or steering the light.

15. The method of claim 12, wherein the sensing of the second sensor information is performed by a radar sensor, and wherein the method further comprises controlling the radar sensor to at least one of steering a beam or adjusting a beamwidth of the beam.

16. The method of claim 11, wherein the processing of the first sensor data and the second sensor data comprises at least one of digital processing or analog processing.

17. The method of claim 11, further comprisingi
outputting identification information related to the at least one target.

18. The method of claim 17, wherein the identification information comprises at least one of an identity, a velocity, or a location of the at least one target.

19. The method of claim 17, wherein the identification information is in a point cloud format.

20. A method for environmental perception of a first vehicle, comprising:
generating, by a first sensor module on a second vehicle, sensor data;
transmitting, by the first sensor module on the second vehicle, the sensor data to a second sensor module on the first vehicle;
receiving, by the second sensor module on the first vehicle, the sensor data; and
identifying at least one target by using the sensor data, wherein the at least one target is a road marking for navigation.

* * * * *